US011840318B2

(12) United States Patent
Kyrkjebø

(10) Patent No.: US 11,840,318 B2
(45) Date of Patent: Dec. 12, 2023

(54) VESSEL FOR FARMING OF MARINE ORGANISMS

(71) Applicant: Jan Erik Kyrkjebø, Rådal (NO)

(72) Inventor: Jan Erik Kyrkjebø, Rådal (NO)

( * ) Notice: Subject to any disclaimer, the term of this patent is extended or adjusted under 35 U.S.C. 154(b) by 577 days.

(21) Appl. No.: 17/056,548

(22) PCT Filed: May 13, 2019

(86) PCT No.: PCT/NO2019/050106
§ 371 (c)(1),
(2) Date: Nov. 18, 2020

(87) PCT Pub. No.: WO2019/221607
PCT Pub. Date: Nov. 21, 2019

(65) Prior Publication Data
US 2021/0206457 A1     Jul. 8, 2021

(30) Foreign Application Priority Data

May 18, 2018   (NO) .................................. 20180701

(51) Int. Cl.
| B63B 35/24 | (2006.01) |
| A01K 61/60 | (2017.01) |
| A01K 63/10 | (2017.01) |
| B63B 35/00 | (2020.01) |
| B63B 34/00 | (2020.01) |
| B63B 5/24 | (2006.01) |

(52) U.S. Cl.
CPC ................ B63B 5/24 (2013.01); A01K 61/60 (2017.01); A01K 63/10 (2017.01); B63B 34/05 (2020.02); B63B 35/00 (2013.01)

(58) Field of Classification Search
CPC ......... B63B 35/24; B63B 35/00; B63B 34/05; A01K 61/60; A01K 63/10
See application file for complete search history.

(56) References Cited

FOREIGN PATENT DOCUMENTS

| CN | 2114290 U | 9/1992 |
| CN | 101933484 B | 1/2011 |
| CN | 101933484 B | 9/2011 |
| CN | 202385621 U | 8/2012 |
| CN | 203186551 U | 9/2013 |
| CN | 106945791 A | 7/2017 |
| NO | 861157 A | 9/1987 |
| WO | 2011/133045 A1 | 10/2011 |
| WO | 2011133045 A1 | 10/2011 |
| WO | WO-2018048310 A1 * | 3/2018 ............. A01K 61/00 |
| WO | 2019/221607 A1 | 11/2019 |

OTHER PUBLICATIONS

"International Search Report" PCT/NO2019/050106 (Barbro E. Sæther) dated Jan. 7, 2019 (Jan. 7, 2019).

* cited by examiner

*Primary Examiner* — Stephen P Avila
(74) *Attorney, Agent, or Firm* — Flener IP & Business Law; Zareefa B. Flener

(57) ABSTRACT

A vessel for farming of marine organisms includes several tanks with seawater and the marine organisms that shall be farmed, where the tanks include a farming net cage that holds the marine organisms and where the tanks are open to the surrounding seawater.

10 Claims, 3 Drawing Sheets

US 11,840,318 B2

VESSEL FOR FARMING OF MARINE ORGANISMS

FIELD OF THE INVENTION

The present invention relates to a vessel for farming of marine organisms, said vessel comprises several tanks with sea water and the marine organisms which shall be farmed, and also that the tanks are open at the bottom towards the surrounding sea water.

DESCRIPTION OF PRIOR ART

NO20100465 relates to farming installations in converted tankers and bulk carriers, and also associated applications for the farming of fish and shellfish. Described here is a closed installation which is physically separated from the ocean so that disadvantages such as escapes, salmon lice and illness no longer represent a problem.

NO20120852 relates to a corresponding floating production plant in a primary reequipped tanker and which comprises a number of closed and water filled tanks that hold the farming organisms and also associated pumps and pipelines, where each tank comprises water inlets and water outlets for circulating water that is brought from the surrounding sea.

In addition, reference is made to NO 861157 A, CN 101933484 B, CN 203186551 U, CN 202385621 U, CN 2114290 U and CN 106945791 A.

OBJECTS OF THE PRESENT INVENTION

It is an object to provide a tanker or similar ship where one or more farming net cages are placed in the tanks of the ship and where the tanks of the ship have an opening in the bottom for natural filling of the tanks of the ship up to a certain level.

In the main, the tanks can be filled to a level corresponding to the level outside the vessel when ballasting of the vessel and thus giving a low lifting height for the water in the farming net cages. This saves energy.

By having a walkway over the water surface in each tank on the ship that is connected to each other, a simple operation of the farming net cages and the installation is achieved. The advantages with this are that one gets a better logistics of the movement of the fish and the sorting and also a better feed logistics. During operation, the hatches of the tanks can be closed, the feeding can be continuous and there are no attacks from birds that can stress the fish. The lighting can be carried out such that the fish will not be sexually mature before slaughter.

SUMMARY OF THE INVENTION

The above mentioned objects are reached with a vessel for farming of marine organisms, said vessel comprises several tanks with seawater and the marine organisms that shall be farmed. The tanks are open to the surrounding seawater at the bottom, and respective tank comprises a farming net cage that holds the marine organisms. The farming net cages comprise a net that holds the marine organisms and, in relation to the net, an externally lying canvas, and said tanks comprises, or are in connection with, a water inlet line for supply of sea water to the farming net cage and said tanks comprises, or are connected to, a water outlet line for outflow of sea water from the farming net cage.

Said tanks at the bottom of the vessel preferably comprises an opening to the sea water for throughflow of the surrounding sea water, as each tank is arranged to be filled up to a level which corresponds to the sea water level outside the vessel.

The tanks can be connected to each other via a channel or passage that runs through the tank walls.

It is preferred that said tanks comprise a walkway that stretches over the water surface in said farming net cages. The walkways can be placed under the deck of the vessel and be connected to each other via the channel that runs between respective tanks.

A fastening collar can be mounted under respective walkways, where the fastening collar functions as a suspension for a farming net cage.

A respective farming net cage can, in a bottom area, comprise a waste separator, said waste separator is connected to a waste installation on the vessel.

The outlet of the water outlet line is preferably placed in the seawater at a level which is deeper than the inlet of the water inlet line.

Furthermore, respective farming net cages can comprise one or more water distributors arranged to set the water in each cage in a rotary movement.

The net in respective farming net cages can be a water permeable net. Similarly, the canvas in respective farming net cages can be a watertight canvas or canvas bag.

DESCRIPTION OF THE FIGURES

Preferred embodiments of the invention shall be described in the following in more detail with reference to the enclosed figures, in which.

DESCRIPTION OF PREFERRED EMBODIMENTS OF THE INVENTION

Figure 1:
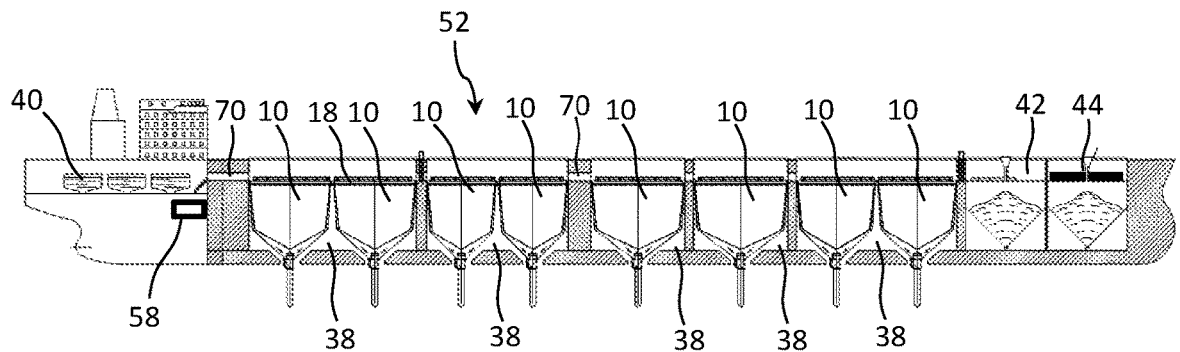
FIG. 1 shows a cross-section of a vessel according to the invention, along the line A-A in FIG. 2, which is equipped with several tanks with farming net cages.
Figure 2:
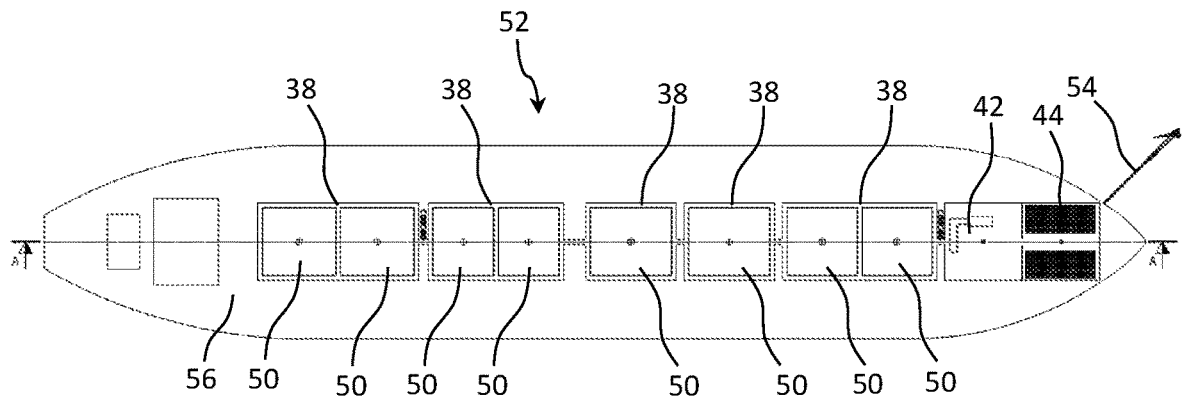
FIG. 2 shows the vessel according to the invention, seen from above and from the outside.
Figure 3:
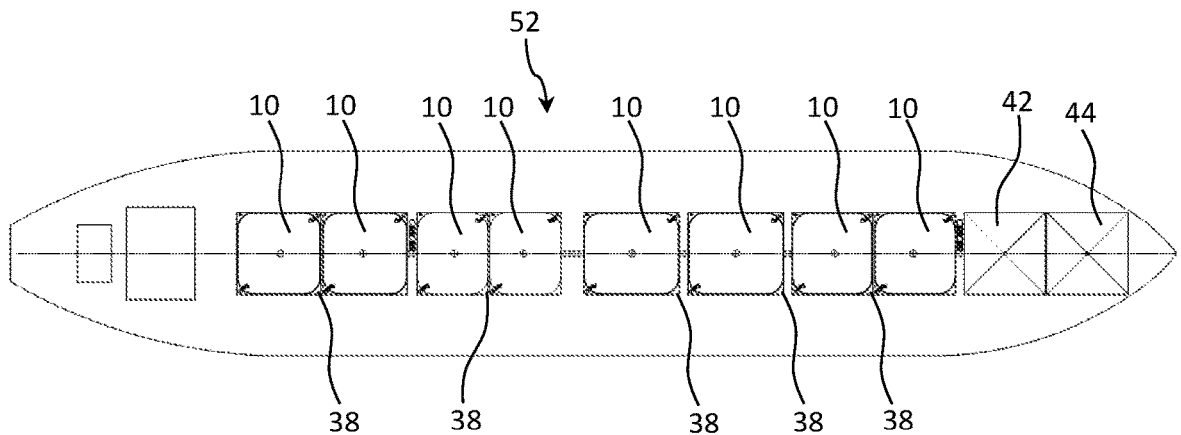
FIG. 3 shows the vessel according to the invention, seen from above and at the same level as the farming net cages.

The invention relates to a reequipped vessel 52 equipped with several tanks 38 filled with respective farming net cages 10 for farming of marine organisms, such as fish. Aft of the tanks 38, the vessel 52 can have one or more hatchery tanks 40 for the farming of smolt, which gets fresh water from a desalination unit. Such desalination units are common on large ships for making, among other things, drinking water from saltwater. In a forward part of the vessel 52, there can be tanks or rooms 42, 44 with processing and packinghouse for fish. A vessel 52 according to the invention will thus be able to provide a complete production line from smolt, farming in several stages and slaughter and packing of the finished fish product.

Furthermore, the vessel 52 is equipped as a tanker of this kind and is consequently not explained in more detail. The vessel 52 comprises ballast tanks 20. Furthermore, the vessel 52 can be anchored via anchoring lines 54 so that the vessel lies stably in the wind.

An essential feature of the invention is that the tanks 38 of the vessel 52 are open to the surrounding sea 62. Therefore, the tanks 38 are equipped with an open sea water opening 36 such that the surrounding sea water 62 can "freely" flow in and out through the sea water opening 36 in the bottom of each tank 38. The sea water opening 36 functions as a water inlet and water outlet for the tank 38.

Figure 4:
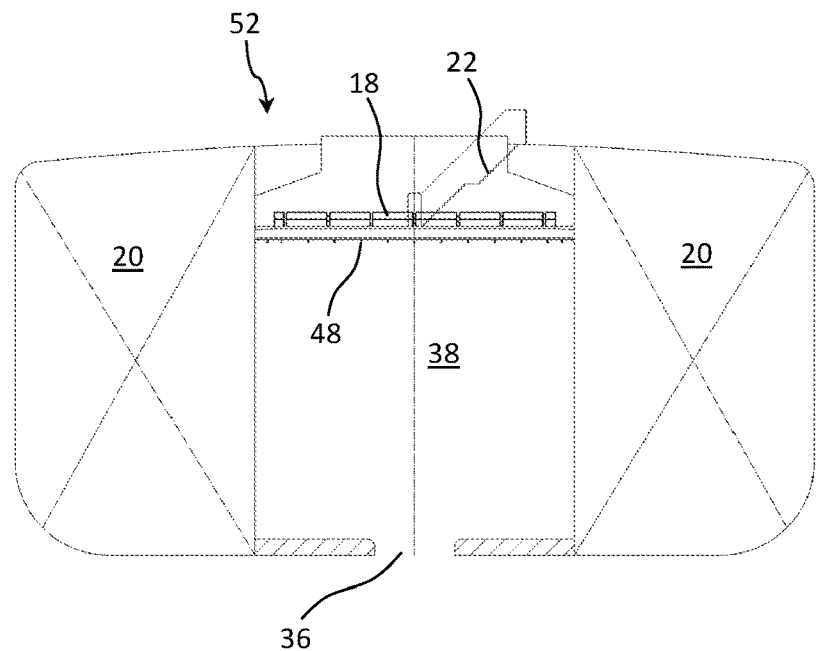
FIG. 4 shows a transvers cross-section of the vessel according to the invention, and with an empty tank.
Figure 5:
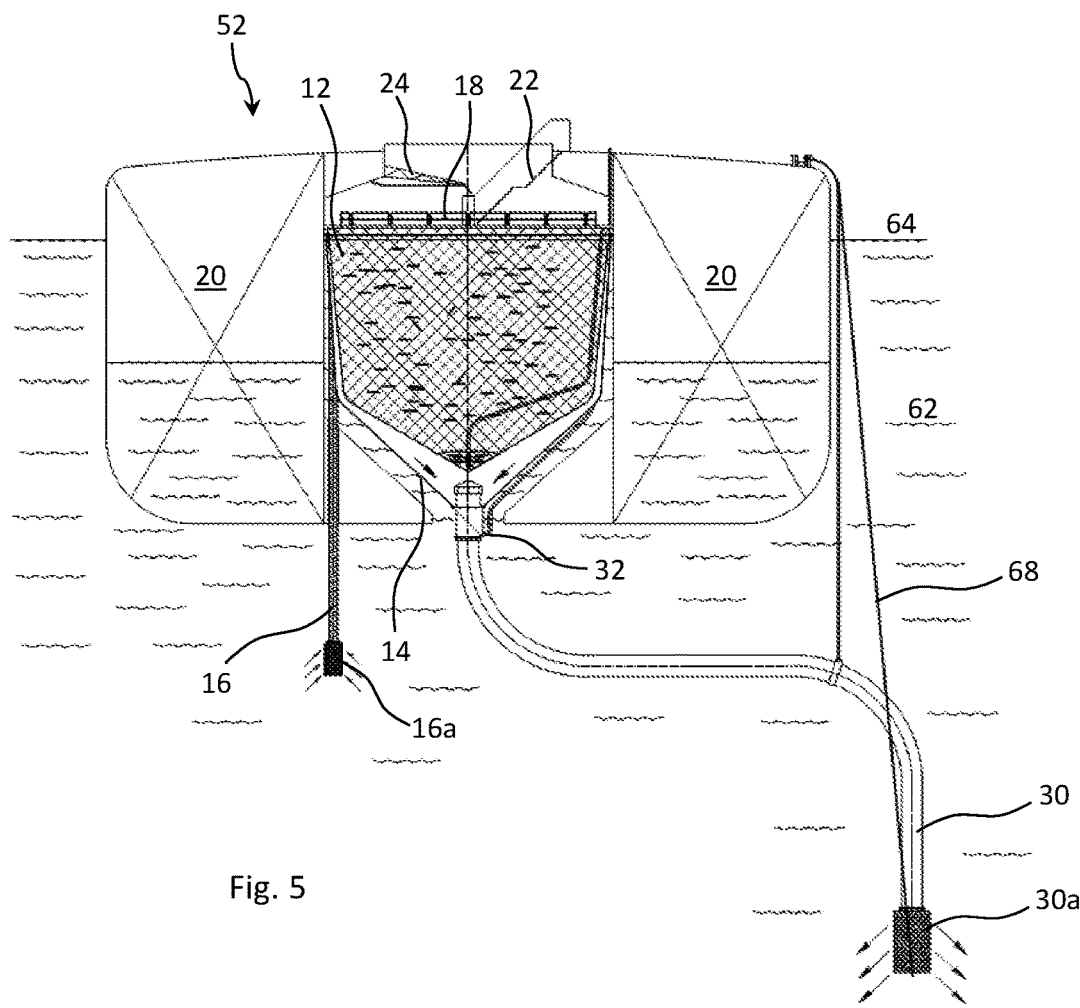
FIG. 5 shows a transverse cross-section of the vessel according to the invention, and with a tank equipped with a farming net cage.
Figure 6:
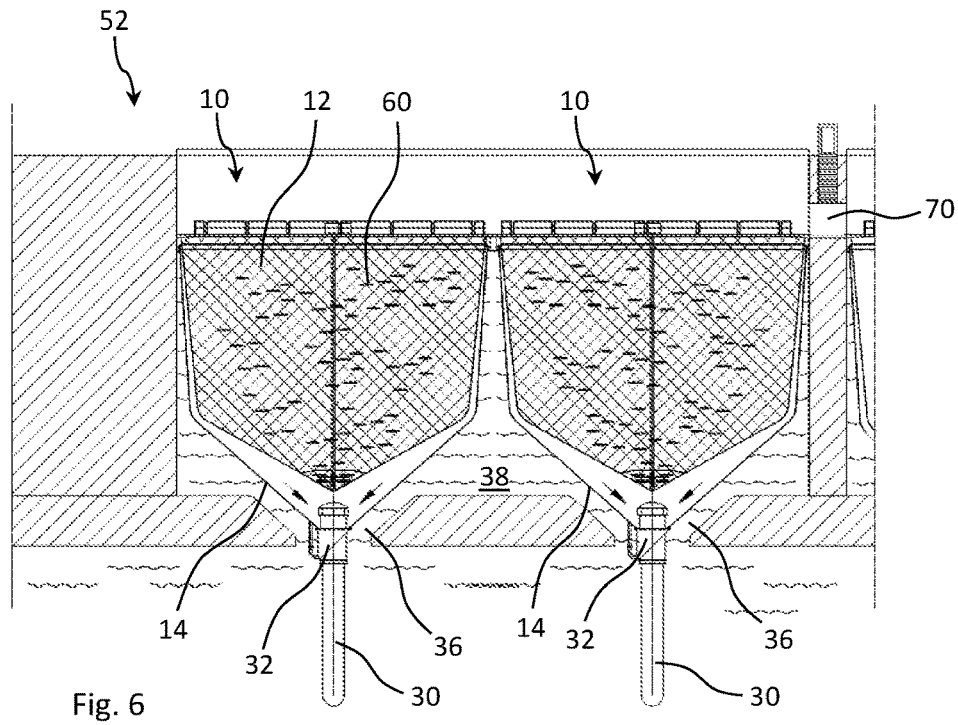
FIG. 6 shows a cutout section in longitudinal direction of the vessel according to the invention, with a tank equipped with two farming net cages.

The seawater opening 36 can have a conical cross section, as for instance shown in FIGS. 5 and 6, such that the shape of the seawater opening corresponds roughly with the lower conical part of the farming net cage 10. Alternatively, to reduce the amount of refitting of the vessel 52, the sea water opening can be formed as shown in FIG. 4.

Each tank 38 is preferably equipped with walkways 18 that run around the farming net cages 10 and/or alternatively they can stretch across the farming net cages. The walkways 18 and the fastening collar 48 are secured internally in the respective tank 38. Stairs 22 can run from the walkways 18 up to the deck 56 on the vessel 52. Furthermore, the tank walls 38a can have openings in the form of a channel 70 such that the walkways 18 can form a continuous walkway or admission path through the whole vessel 52, readily from the hatchery tanks 40 and up to the processing and the packing units 42, 44.

Figure 7:
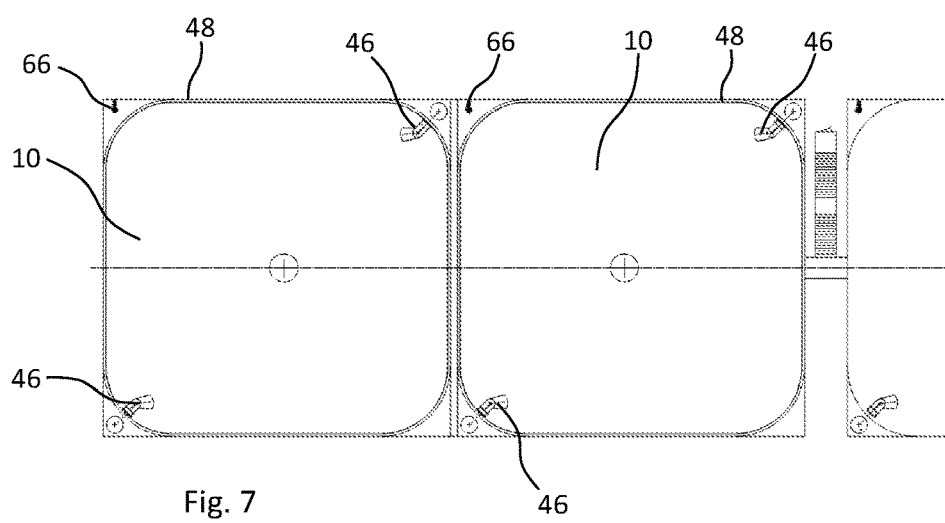
FIG. 7 shows the farming net cages shown in FIG. 6 seen from above.
Figure 8:
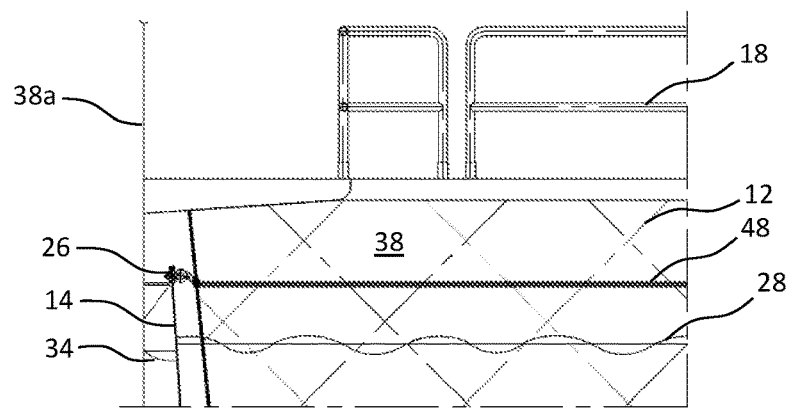
FIG. 8 shows the suspension of a farming net cage in a tank.

A farming net cage 10 is inserted and mounted in an empty tank 38, as shown in FIG. 4, and can be suspended under the walkway 18 in a fastening collar 48 and possibly to a fastening 26 on the tank wall 38a, as shown in FIG. 8. The fastening collar 48 for the canvas or the canvas bag 14 and the net 12 is often at two levels. This is to utilise as much of the area in the tanks 28 as possible. The net 12 and the canvas 14 can therefore be suspended with an upper, approximately rectangular form as illustrated in FIG. 7.

The tanks 38 can have, as shown in FIG. 1, different dimensions and can comprise one or more farming net cages 10. Similarly, respective tank 38 or farming net cage 10 can be closed with the help of hatches 50.

In more detail, as a farming net cage 10 one can use a water penetrable net 12 which is suspended under the walkway 18, while an externally lying canvas 14 or canvas bag is mounted to the fastening point 26 on the tank wall 38a. The net 12 holds the fish that shall be farmed, while the canvas 14 prevents surrounding seawater 62 from mixing with the water inside the net 12. However, if it is appropriate it is possible that only one net 12 is used in one tank 38, while only one canvas 14 is used in a different tank 38.

Each tank 38 comprises one or more farming net cages 10. In the examples shown one or two farming net cages 10 are used in each tank 38.

By having a sea water opening 36 in the bottom of each tank 38, a water surface 34 in the tank 38 can be held at the level of the sea water 64 outside the vessel 52. The water level 34 inside the tank 38 can be set by ballasting the vessel 52 with water into and out of the ballast tanks 20. In this way the vessel 52 is set at a level where the water surface 34 inside the tank 38 is filled up to the upper edge of the canvas 14 and the level of the water surface 28 inside the canvas 14 will then be only a few cm higher to make the canvas bag "stretch". As for instance shown in FIG. 8.

The result is that the sea water in reality does not need to be lifted up to any extent inside the farming net cage 10, and therefore there will, in the main, only be a need to circulate the sea water.

Furthermore, each tank 38 or farming net cage 10 can be equipped with one or more water inlet lines 16 that are connected to respective water distributors 46 to set the water in the farming net cages 10 in circulation. The outlet nozzle of the water distributors 46 can be equipped with flexible bends to control the flow of water such that the water in the farming net cage 10 can be set to flow in a rotary movement. FIG. 7 shows two water distributors 46 mounted opposite each other in each farming net cage 10. Naturally, more or fewer water distributors can be used, for example, one in each "corner". The water which is collected from the water inlet lines 16 to the farming net cages 10 can preferably be brought up from a depth which is free of lice and from a different depth than the water which is driven into the tank 38 from the surrounding seawater 62.

To contribute to circulation in the farming net cages 10, each tank 38 or farming net cage 10 comprises a water outlet line 30 where water is transported out. The water outlet of the water outlet line 30 is preferably placed lower than the inlet of the water inlet line 16 such that a "syphon" effect is formed. The water outlet line 30 and the water outlet can be suspended in respective ropes 68 or the like.

Both the water inlet line 16 and the water outlet lines 30 can comprise respective water filters 16a, 30a at the end of the lines. In particular, such a filter 16a on the water inlet line 16 will prevent the inflow of unwanted particles or organisms such as jellyfish, lice, amoeba and poisonous algae in the seawater layer. The filter 16a is, as shown in FIG. 5, submerged and is formed approximately as a cylinder. One embodiment of the filter 16a can be equipped with a filter canvas or net which constitutes the wall together with a framework that surrounds the water inlet for the supply of seawater in the net cage. The filter can be self-cleaning by comprising an internal water-driven and rotating boom containing a vertical flushing line comprising a nozzle that is directed towards, and at a certain distance from, the filter canvas, and also the boom can have, in the main, horizontally directed nozzles that are arranged to generate a reaction force that creates a rotary moment about the shaft of the boom to set the boom into a controlled rotation.

The water inlet line 16 and the water outlet line 30 can run through the seawater opening 36 in the bottom of each tank 38 or through suitable openings in the hull of the vessel.

FIG. 5 shows the water outlet line 30 as a line with a filter 30a at the end. FIG. 6 shows the water outlet line as a tube, said tube can be equipped with a filter if required.

Each farming net cage 10 can initially be formed, in the main, as a standard farming net cage. For example, the net 12 can, in the lower part, comprise a dead fish collector, which is connected via a pipeline to a pump 66. The pump 66 can be a waste material pump placed in the fastening collar 48 to pump the waste up to a collecting tank, or a filter at a different location on the vessel 52.

The net 12 and walkways 18 go above the fastening collar 48. The tending of the fish 60 takes place from the walkways.

Furthermore, the farming net cage 10 can, in a lower part, i.e. a lower part of the canvas 14, also comprise a waste separator 32 which can collect waste in a corresponding way, and which is connected via a pipeline with a waste installation 58 on the vessel 52. This can be the same collecting tank as mentioned previously. The water outlet line 30 can be mounted to the waste separator 32. If a waste separator 32 is not used, the water outlet line 30 is mounted to the lower conical part of the canvas 14.

The farming net cages 10 can farm fish at different stages of growth, from the hatchery and smolt to fish ready for slaughter. Connected to each farming net cage can be dedicated oxygen tanks, feed tanks and a cleaning installation that supplies each net cage with feed and oxygen, respectively, and which filters the sediment/sludge from the water in the net cage.

Underneath the walkways 18, or on the fastening collars 48, lines can be mounted for pumping of fish, and also feed hoses can be mounted. Furthermore, each tank 38 or farming net cage 10 can be equipped with a feed distributor 24.

Furthermore, the vessel 52 can comprise siloes for feed and with filling from the main deck 56.

The walkway 18 is shown at a level about one metre above the water surface 28 in the farming net cage 10.

To catch the fish a fishing net can be used. Alternatively, the fish can be displaced and sucked up.

The walkways 18 can comprise removable sections so that there is access to be able to carry out service and operations on the pumps, cleaning of the canvas and fastening on the net at delivery of the fish.

The longitudinally running channel 70 or passage that connects the walkways 18 in each tank 38 with each other is provided in the tank walls 38a between the tanks 38. The channel 70 preferably runs through the tank walls 38a or the bulkhead in the vessel 52 at the same level as the walkways 18. This channel 70 that connects the tanks 38 and other areas through the vessel 52 forms a closed channel that makes it possible to tend the fish efficiently and can be used for the transport of fish and feed hoses, and the fishermen can move quickly and move equipment from net cage to net cage in an efficient way. The advantages are that one gets a much better logistics for the movement and the sorting of the fish and also better feed logistics. The channel 70 also makes it possible to avoid the use of ladders for each tank.

The vessel 52, which is considered used, is normally so large that an additional work platform deck (walkways etc) can be built under the main deck, which makes it possible to use flexible canvas bags as farming containers.

The invention claimed is:

1. A vessel for farming of marine organisms, said vessel comprises:
    a plurality of tanks with seawater and the marine organisms that shall be farmed,
    the tanks being open at a bottom of the tanks to surrounding seawater, said tanks each comprising a farming net cage that holds the marine organisms,
    wherein the farming net cage comprises a net that holds the marine organisms and, in relation to the net, an externally lying canvas,
    wherein said tanks comprise or are connected to a water inlet line for supply of seawater to the farming net cage,
    wherein said tanks comprise or are connected to a water outlet line for outflow of seawater from the farming net cage, and
    wherein said tanks are connected with each other via a channel or a passage that runs through tank walls.

2. The vessel according to claim 1, wherein said tanks comprise an open seawater opening at the bottom for throughflow of surrounding seawater, as each tank being configured to be filled with seawater to a level which corresponds to the seawater level outside the vessel.

3. The vessel according to claim 1, wherein said tanks each comprise a gangway that extends over a surface of the seawater in said farming net cages.

4. The vessel according to claim 3, wherein said gangways are placed under a deck of the vessel and are connected with each other via a channel that runs between respective tanks.

5. The vessel according to claim 3, wherein a fastening collar is mounted under the gangways, where the fastening collar functions as a suspension point for the farming net cage.

6. The vessel according to claim 1, wherein the farming net cage comprises, in a bottom area, a waste separator, said waste separator is connected to a waste installation on the vessel.

7. The vessel according to claim 1, wherein an outlet of the water outlet line is placed in the seawater at a level which is deeper than an inlet of the water inlet line.

8. The vessel according to claim 1, wherein the farming net cages comprise one or more water distributors configured to set the seawater in each farming net cage in a rotary motion.

9. The vessel according to claim 1, wherein the net in the farming net cages is a water permeable net.

10. The vessel according to claim 1, wherein the canvas in the farming net cages is a watertight canvas.

* * * * *